(12) United States Patent
Birbeck et al.

(10) Patent No.: US 12,091,829 B2
(45) Date of Patent: Sep. 17, 2024

(54) APPARATUS FOR AN ARTIFICIAL REEF AND METHOD

(71) Applicant: ARC MARINE LTD, Brixham (GB)

(72) Inventors: Thomas Birbeck, Torquay (GB); James Doddrell, Torquay (GB)

(73) Assignee: ARC MARINE LTD, Brixham (GB)

( * ) Notice: Subject to any disclaimer, the term of this patent is extended or adjusted under 35 U.S.C. 154(b) by 1504 days.

(21) Appl. No.: 16/467,248

(22) PCT Filed: Dec. 6, 2017

(86) PCT No.: PCT/GB2017/053678
§ 371 (c)(1),
(2) Date: Jun. 6, 2019

(87) PCT Pub. No.: WO2018/104734
PCT Pub. Date: Jun. 14, 2018

(65) Prior Publication Data
US 2020/0149238 A1 May 14, 2020

(30) Foreign Application Priority Data
Dec. 6, 2016 (GB) ...................................... 1620752

(51) Int. Cl.
*A01K 61/73* (2017.01)
*A01K 61/77* (2017.01)
(Continued)

(52) U.S. Cl.
CPC .............. *E02B 3/046* (2013.01); *A01K 61/73* (2017.01); *A01K 61/77* (2017.01); *B28B 7/183* (2013.01); *B28B 7/32* (2013.01)

(58) Field of Classification Search
CPC . E02B 3/046; E02B 3/129; E02B 3/14; A01K 61/73; A01K 61/77; B28B 7/183; B28B 7/32
See application file for complete search history.

(56) References Cited

U.S. PATENT DOCUMENTS

| 954,283 A | * | 4/1910 | Hawkes | .................... E02B 3/06 |
| | | | | 405/21 |
| 3,548,600 A | * | 12/1970 | Hendrik | .................... E02B 3/14 |
| | | | | 405/30 |

(Continued)

FOREIGN PATENT DOCUMENTS

| CN | 1775010 A | 5/2006 |
| CN | 204560622 U | 8/2015 |

(Continued)

OTHER PUBLICATIONS

Great Britain Application No. 1620752.4, Examination Report Under Section 18(3), date of report: Jan. 17, 2019, 4 pages.

(Continued)

*Primary Examiner* — Benjamin F Fiorello
(74) *Attorney, Agent, or Firm* — Sheppard Mullin Richter & Hampton LLP

(57) ABSTRACT

There is described a module for an underwater structure. The module comprises a plurality of walls defining a cavity configured such that at least two walls of said plurality of walls confront one another to provide respective stack support surfaces for supporting said module, said walls are substantially parallel to form complementary stack surfaces, such that one stack surface may rest on a surface and the other complementary stack surface provides a rest surface for another module. Two or more walls of said plurality of walls each comprise an aperture providing a conduit through each two or more walls to said cavity, respective apertures of said two or more walls and said cavity configured to provide a water flow path into, through and from said cavity. The water flow path may be considered unconstrained or at least substantially unconstrained in that water may flow through the apertures and cavity without deviation or interruption other than by the module or cavity walls. In stacked formation an aperture may be occluded or partially occluded (Continued)

but still the module when on its own may provide water pathways which may be considered unconstrained or substantially unconstrained.

20 Claims, 14 Drawing Sheets

(51) Int. Cl.
*E02B 3/04* (2006.01)
*B28B 7/18* (2006.01)
*B28B 7/32* (2006.01)

(56) References Cited

U.S. PATENT DOCUMENTS

| | | | | |
|---|---|---|---|---|
| 3,759,043 A * | 9/1973 | Tokunaga | ................. | E02B 3/14 |
| | | | | 249/102 |
| 3,896,624 A * | 7/1975 | Chang | ................. | E02B 3/129 |
| | | | | 405/29 |
| 4,041,666 A * | 8/1977 | Sargis | ................. | E04C 2/30 |
| | | | | 52/250 |
| 4,055,322 A * | 10/1977 | Cassidy | ................. | B28B 7/362 |
| | | | | 249/134 |
| 4,129,006 A * | 12/1978 | Payne | ................. | E02B 3/06 |
| | | | | 405/31 |
| 4,205,040 A * | 5/1980 | Aoyama | ................. | B28B 7/362 |
| | | | | 264/233 |
| 4,496,504 A * | 1/1985 | Steenson | ................. | B28B 3/123 |
| | | | | 425/456 |
| 4,928,469 A * | 5/1990 | Dorier | ................. | G09B 25/06 |
| | | | | 52/607 |
| 5,429,451 A * | 7/1995 | Pettee, Jr. | ................. | E02B 3/14 |
| | | | | 405/20 |
| 5,564,369 A * | 10/1996 | Barber | ................. | A01K 63/006 |
| | | | | 405/23 |
| 5,826,394 A * | 10/1998 | Barton, Jr. | ........... | A63H 33/062 |
| | | | | 52/592.1 |
| 6,230,465 B1 * | 5/2001 | Messenger | ................. | E04C 5/07 |
| | | | | 52/630 |
| 6,431,792 B1 | 8/2002 | Barnes | | |
| 6,508,042 B1 * | 1/2003 | Kweon | ................. | E02B 3/14 |
| | | | | 52/574 |
| 6,896,445 B1 * | 5/2005 | Engler | ................. | E02B 3/046 |
| | | | | D25/115 |
| 8,123,434 B1 * | 2/2012 | Smith | ................. | E02B 3/14 |
| | | | | 405/15 |
| 9,896,814 B2 * | 2/2018 | Cox | ................. | E02B 3/066 |
| 9,951,490 B2 | 4/2018 | Scherkl | | |
| 2006/0230702 A1 * | 10/2006 | Doerner | ................. | B28B 7/183 |
| | | | | 52/605 |
| 2013/0047530 A1 * | 2/2013 | Durham | ................. | B28B 7/186 |
| | | | | 52/576 |
| 2015/0152614 A1 * | 6/2015 | Burt | ................. | E02B 3/062 |
| | | | | 405/23 |
| 2016/0044899 A1 * | 2/2016 | Bartkowski | ........... | A01K 61/70 |
| | | | | 405/31 |
| 2018/0010337 A1 * | 1/2018 | Giarritta | ................. | E04C 1/00 |

FOREIGN PATENT DOCUMENTS

| | | |
|---|---|---|
| EP | 1036638 | 9/2000 |
| ES | 2014659 A6 | 7/1990 |
| JP | S57184109 A | 11/1982 |
| JP | H10136829 A | 5/1998 |
| JP | H11005205 A | 1/1999 |
| JP | 2000198108 A | 7/2000 |
| JP | 2001045907 A | 2/2001 |
| JP | 2001355220 A | 12/2001 |
| JP | 2006110727 A | 4/2006 |
| JP | 2016520168 A | 7/2016 |
| KR | 200284979 Y1 | 8/2002 |
| KR | 200358080 | 8/2004 |
| KR | 100460914 B1 | 12/2004 |
| KR | 20090082663 A | 7/2009 |
| KR | 20130037071 A | 4/2013 |
| WO | 9913176 A1 | 3/1999 |

OTHER PUBLICATIONS

Great Britain Application No. 1620752.4, Search Report Under Sections 17 and 18(3), date of search: Apr. 5, 2018, 7 pages.
Great Britain Application No. 1904798.4, Search Report Under Sections 17 and 18(3), date of search: Apr. 17, 2019, 6 pages.
International Search Report and Written Opinion mailed Jun. 14, 2018 in PCT/GB2017/053678, filed Dec. 6, 2017, 11 pages.
Chinese Application No. 201780084192.0, English translation only of Second Office Action mailed Dec. 11, 2020, 6 pages.
European Application No. 17818606.0, Communication Pursuant to Article 94(3) EPC mailed May 12, 2020, 7 pages.
European Application No. 17818606.0, Communication Pursuant to Article 94(3) EPC mailed Oct. 14, 2021, 14 bages.
Japanese Application No. 2019-549663, English translation only of First Notice of Reasons for Refusal mailed Oct. 26, 2021, 11 pages.
Korean Application No. 10-2019-7019476, English translation only of First Notice of Grounds for Rejection mailed Feb. 9, 2022, 7 pages.

* cited by examiner

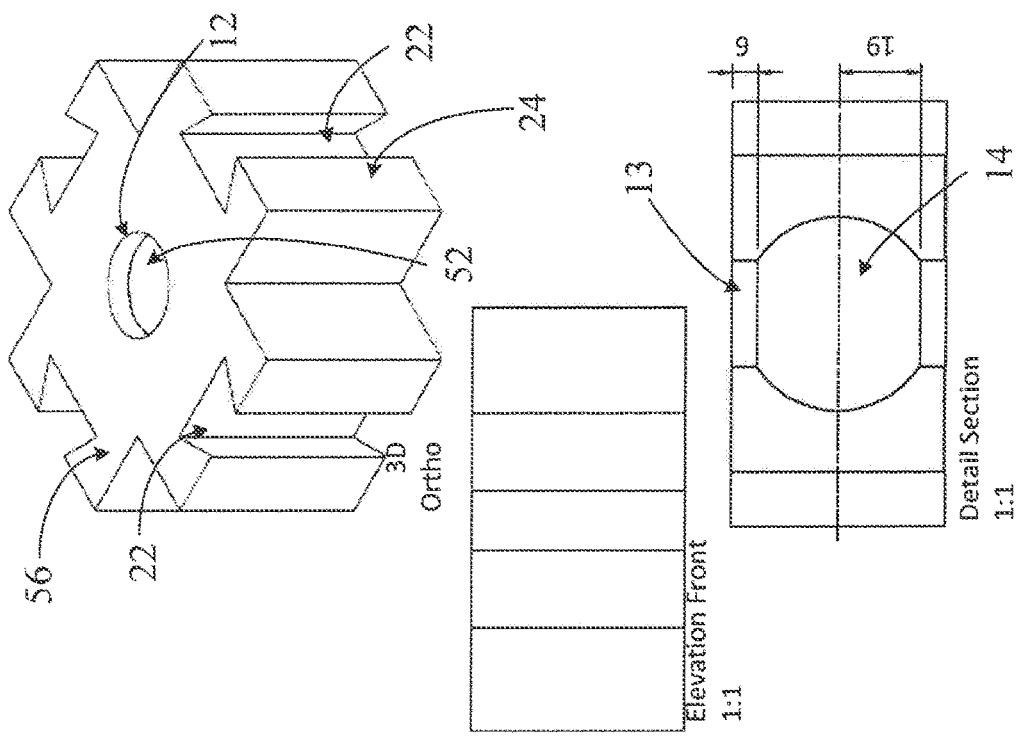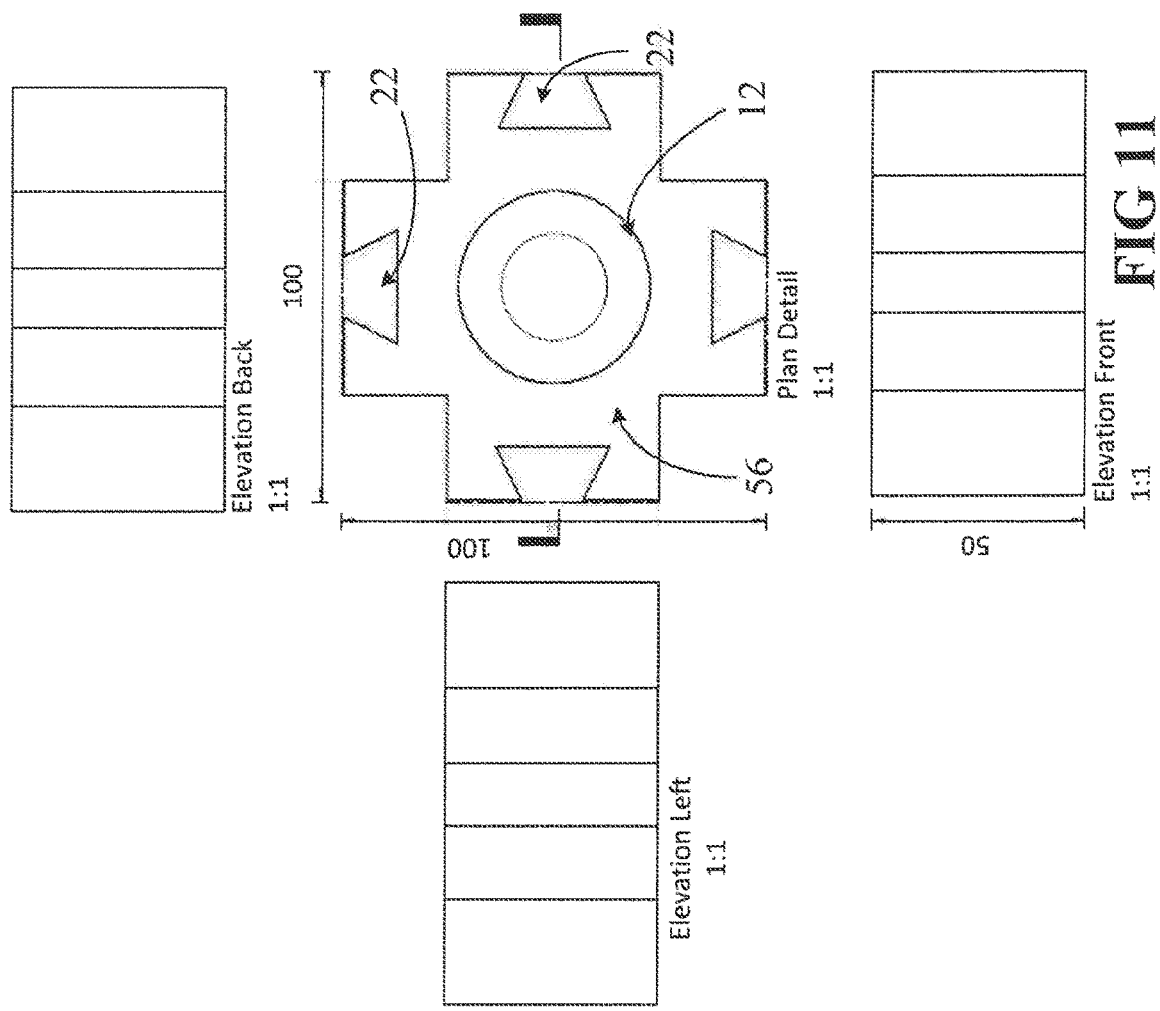
FIG 11

APPARATUS FOR AN ARTIFICIAL REEF AND METHOD

CROSS-REFERENCE TO RELATED APPLICATIONS

This application is a National Phase application under 35 U.S.C. § 371 of PCT Application No. PCT/GB2017/053678, filed Dec. 6, 2017, which application claims priority benefit to Great Britain Application No. 1620752.4, filed Dec. 6, 2016, the entire contents of which applications are hereby incorporated herein by reference.

FIELD

The present invention relates to the field of underwater structures, for example artificial reefs, anti-seabed scouring and anti-trawling structures. More particularly, but not exclusively, one or more embodiments relate to stackable and or inter-engageable interlocking blocks which can be positioned underwater to provide strong and or substantially immoveable structures with the ability to allow and encourage marine life inhabitation.

BACKGROUND

With the need for offshore wind power capacity expected to increase in the near future, there is likely to be an increase in the number of wind turbines that are installed. An important issue with offshore wind turbines that are fixed to the seabed is the 'scouring' of the sand and silt around the support structure. Scouring of the seabed occurs when mobile sand and silt around the turbine support (often a single pole driven into the seabed and known as a "monopile") is 'eaten away', leaving a large conical hole around the wind turbine support. The following shall use the term "monopile" when referring to a support structure for an off-shore wind turbine for brevity and convenience and the teaching of the disclosure should not be limited by the use of that term noting that more than one support pole may be utilised. Sea bed scouring is caused by changes in the flow pattern of the water around the base of a monopile. Currently, the most common technique to counteract scouring is to dump rock and other such material, typically up to 200,000 tonnes, around the base of the support monopile.

Another current issue involving the sea is the depletion of the natural habitat on the seabed available for sea creatures and plants. This is partly due to detrimental bottom trawling practices used in commercial fishing, where the seabed is scraped to such an effect that fragile reef systems are destroyed. This has a negative effect on breeding grounds for fish, resulting in depletion of many marine species. There are attempts to mitigate this by enforcing 'no trawl' zones to create reserves where no bottom trawling is permitted. However, this is sometimes ignored by commercial fishermen and it is very hard for the authorities responsible for the care of the no trawl zone to enforce the restriction.

Known methods of protection include the use of so called 'Czech Hedgehogs', tank traps or other heavy objects placed underwater to block the trawls and deter commercial fishermen. The size of trawls and boats is ever increasing and the current methods to inhibit bottom trawling are becoming inadequate and are now more of a hindrance than the prevention they used to be.

Attempts to reverse this depletion have resulted in the creation and implementation of artificial marine habitats and structures. Some examples include the sinking of retired ships, bundles of car tyres, concrete breeze blocks and so on.

Aspects and embodiments of the present invention have been devised with the foregoing in mind.

SUMMARY

Viewed from a first aspect the present invention provides a module for an underwater structure. The module comprises a plurality of walls defining a cavity configured such that at least two walls of said plurality of walls confront one another to provide respective stack support surfaces for supporting a said module, said walls are substantially parallel to form complementary stack surfaces, such that one stack surface may rest on a surface and the other complementary stack surface provides a rest surface for another module. Two or more walls of said plurality of walls each comprise an aperture providing a conduit through each two or more walls to said cavity, respective apertures of said two or more walls and said cavity configured to provide a water flow path into, through and from said cavity. The water flow path may be considered unconstrained or at least substantially unconstrained in that water may flow through the apertures and cavity without deviation or interruption other than by the module or cavity walls. In stacked formation, an aperture may be occluded or partially occluded but still the module when on its own may provide water pathways which may be considered unconstrained or substantially unconstrained.

The central cavity defined by the plurality of walls of said module substantially provides protection for, and encourages, growth of marine life such as fish, corals, barnacles, shellfish, sea-weed and other flora and fauna. Ingress of water through said apertures in said walls may encourage or promote diffusion of local sea currents through and out of said module. By permitting water flow through the module the formation of "scouring currents" around the module, or a collection of modules, is discouraged compared to an arrangement that blocks water flow. This will significantly reduce local sea-bed scouring around monopile supports for wind turbines and the module itself. The module is particularly suitable as an artificial reef block and for use in combining with other such blocks to form an artificial reef.

Although water flow into, through and out of the module through the cavity and apertures is unconstrained or substantially unconstrained the presence of the module walls may act to disrupt water flow and promote dispersion of currents thereby avoiding strong current flow in and through the module. Disruption or dispersion of current flow in and through modules may assist in encouraging or promoting marine life growth in the module.

The substantially parallel stack support surfaces of said module enables said module to be stacked one on top of each other, forming an artificial reef structure. Whereby substantially parallel stack supports relate to two opposing surfaces on the top and bottom of said module arranged to allow efficient stacking of more than one said module.

Any suitable settable material may be used to form a said module provided it is sufficiently viscous to substantially fill the mould and is not soluble in water when set. Suitably, said walls comprise a masonry material, for example a wall may comprise concrete. Masonry material is relatively heavy and may comprise various brick, rock or other material found in masonry, including metal rods and mesh typically bound together with concrete.

Furthermore, said module comprises one or more apertures that are configured so that the module walls have sufficient mechanical strength to support at least one said module and the apertures allow substantial ingress of water to a cavity within said module, for example said cavity may comprise curved walls configured to provide a support arch for one or more of said plurality of walls. Said cavity may act as a shelter for marine life such as shells, crustaceans, fish, and other flora and fauna.

In an embodiment of the module said cavity comprises curved walls configured to provide a vault-like support for one or more of said plurality of walls.

Additionally, the module may include a plurality of textured or smooth walls, wherein at least one of said plurality of walls comprises a rough outer surface to promote growth of certain species of marine life.

Viewed from a second aspect, the module further comprises an engagement formation on at least one of said plurality of walls configured to engage with a complementary formation disposed on an element external to said module, wherein said engagement formation is disposed on an outer wall of said one or more plurality of walls. This allows one or more of said modules to be interlocked together to form a substantially rigid monolithic structure.

Said engagement formation being disposed on at least two of said plurality of walls and wherein a first said engagement on a first of said at least two of said plurality of walls is complementary to a second said engagement formation on a second of said at least two or more plurality of walls. Said at least two of said plurality of walls oppose each other so as to provide respective stack surfaces.

First and second engagement portions on said at least two of said plurality of walls are configured for engagement with a laterally disposed element external to said module. The engagement may be a vertically disposed element external to said module.

In at least one embodiment there is provided an external element configured to engage with a module. Such an element may comprise a part of a larger structure such as a jetty or sea wall or the like. Suitably, the external element may be another module or at least comprise another of the modules.

Viewed from a third aspect there is provided a method of manufacturing a module for an artificial reef block, the method comprising placing an object having the shape of a cavity to be formed in a module to be manufactured in a mould comprising an inner configuration corresponding to the outer configuration of said module; placing a first and second ring to 20 extend from respective first and second inner walls to said object; filling said mould with a settable mixture comprising masonry material; and allowing said settable mixture to set and removing said module from said mould.

Suitably, the method further comprises removing said first and second ring prior to removing said module from said mould to allow removal of said object. Said object that forms said cavity is collapsible so as to aid removal of said object from said module with ease and may comprise an inflatable object that is deflatable so as to aid removal of said object from said module.

Additionally the method may comprise removing some partially set mixture from an exterior or interior wall or part thereof to provide a rough surface so as to expose aggregate surfaces. This allows for a variety of surface textures for adhesion of many different marine life species which require a variety of said textures.

Viewed from a fourth aspect there is provided a structure comprising a plurality of modules, wherein a first group of said plurality of modules support a second group of said plurality of modules, a stack surface of each of said second group of said plurality of modules resting on one or more stack surfaces of said first group of said plurality of modules.

In particular, wherein adjacent modules in a lateral direction are interlocked with each other via said engagement formation and complementary engagement formation for form a substantially rigid monolithic structure for use in sea defence, artificially reef, fishing, anti-trawl, and anti-scour applications.

In a particular embodiment of the structure adjacent modules in a vertical direction are interlocked with each other via said engagement formation and complementary engagement formation.

Said walls of said modules may be a plastic material to discourage growth of marine life and aid to removal of said module at the end of its life. Said plastic material may comprise a suitable thermoplastic such as Low Density Polyethylene (LDPE), High Density Polyethylene (HDPE), Polypropylene, Polyvinyl Chloride (PVC), Polyethylene Terephthalate (PET), recycled plastic, or other similar materials. The method of construction could be, but not be limited to, extrusion moulding, injection moulding, vacuum forming, stretch moulding, or blow-moulded.

BRIEF DESCRIPTION OF THE FIGURES

One or more specific embodiments in accordance with aspects of the present invention will now be described, by way of example only, and with reference to the following drawings in which:

FIG. 11 schematically illustrates an isometric projection of one embodiment of an interlockable artificial reef block in accordance with an embodiment of the present invention;

DESCRIPTION

Figure 1:
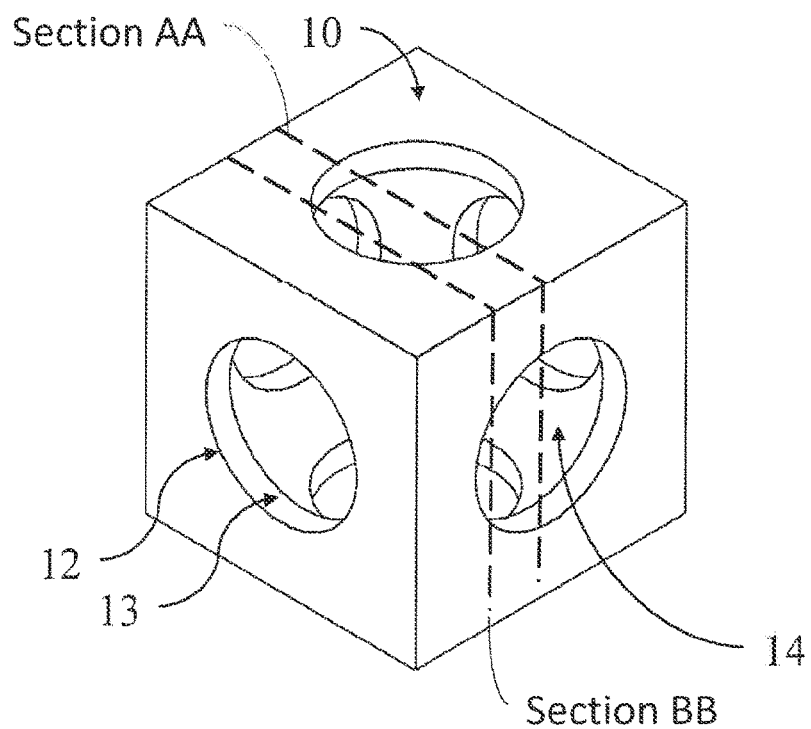
FIG. 1 schematically illustrates an isometric projection of an embodiment of an artificial reef block in accordance with an embodiment of the present invention.

FIG. 1 is an illustrative schematic drawing of an artificial reef block 10 in accordance with an embodiment of the present invention. Such a reef block 10 may be utilised for the promotion of growth of marine wildlife, for example; coral; oysters; barnacles; seaweed and the like. Such a reef block 10 may also provide protection for various fish species during their early life development by way of the central spherical cavity 14 providing shelter. The configuration of the artificial reef block 10 is cuboid, and is generally but not exclusively, of a concrete mixture. One specific mix is made of stone, sand, cement, high-range plasticiser, micro silica and silica fibres. An illustrative ratio of the main constituents could be 3 parts stone or substrate, 2 parts sand, 1 part cement, 1 part micro silica. Additionally, 100 ml of plasticiser (ADVA 650), and 10-20 g of fibres are incorporated and mixed in to the above mix for a module of 1 m³. 100 ml corresponds to 0.0001 m³ and therefore is not a significant ratio in terms of parts, and considered to be an additive to the main mix. There are a total of seven parts contributing to the 1 m³ reef block, therefore one part corresponds to a volume of ⅐ m³. The additional fibres used are typically a high-performance, monofilament, polypropylene fibre developed as a crack controlling additive for cementitious materials. It is used to inhibit the formation of small cracks which can occur through plastic shrinkage, premature drying and early thermal changes, in order to provide utilisation of the intrinsic properties of the hardened cementitious material.

To increase the strength of the concrete mix, the water content generally is reduced so as to lower the water-cement ratio, which causes the mixture to be less workable. The high-range plasticizer is a chemical admixture used for improving the workability of the mix; it is used as a dispersant to avoid particle aggregation; and used to improve flow characteristics. The mix is designed to have a relatively low PH of around 8.3 compared with conventional mixes of concrete, which typically has a PH level of 11-13. This will be more suitable for marine life adhesion.

The micro silica and silica fibres aid in strengthening the artificial reef block 10 and give the mixture a predicted life in seawater of around 500 years. The micro silica and silica fibres also help to minimise the leaching out of any concrete toxins into the environment. Other heavy materials may be used. In some embodiments, an aggregate is added to the mixture and the individual external faces may have a rough surface to promote the growth of barnacles, various algae and other flora and fauna. This may be achieved by gently washing off a small layer of concrete on the exterior of the cube exposing the aggregate before it is fully cured. This gives a range of surface textures which may appeal to a range of sea flora and fauna species. In other embodiments the internal and external surfaces may be relatively smooth, which also has its advantages for other species of marine life.

In the described embodiment, the central cavity 14 is spherical having its centre aligned close to the centre of the surrounding edges of the block 10. The diameter of the cavity is smaller than the length of the smallest face of the block 10, such that it does not extend to the exterior of the block 10. The entrances 12 show the points at which fish and other sea creatures may enter. They allow a passage from the exterior to interior of the artificial reef block and are situated in the centre of all of the external faces. There are cylindrical spaces 13 extending inward from respective exterior faces of the reef block 10, to the interior spherical cavity 14. The central cavity 14 also allows water to flow freely through the artificial reef block 10. Two cross-sectional views labelled section AA and section BB are shown in FIG. 2a and FIG. 2b respectively.

Figures 2A, 2B:
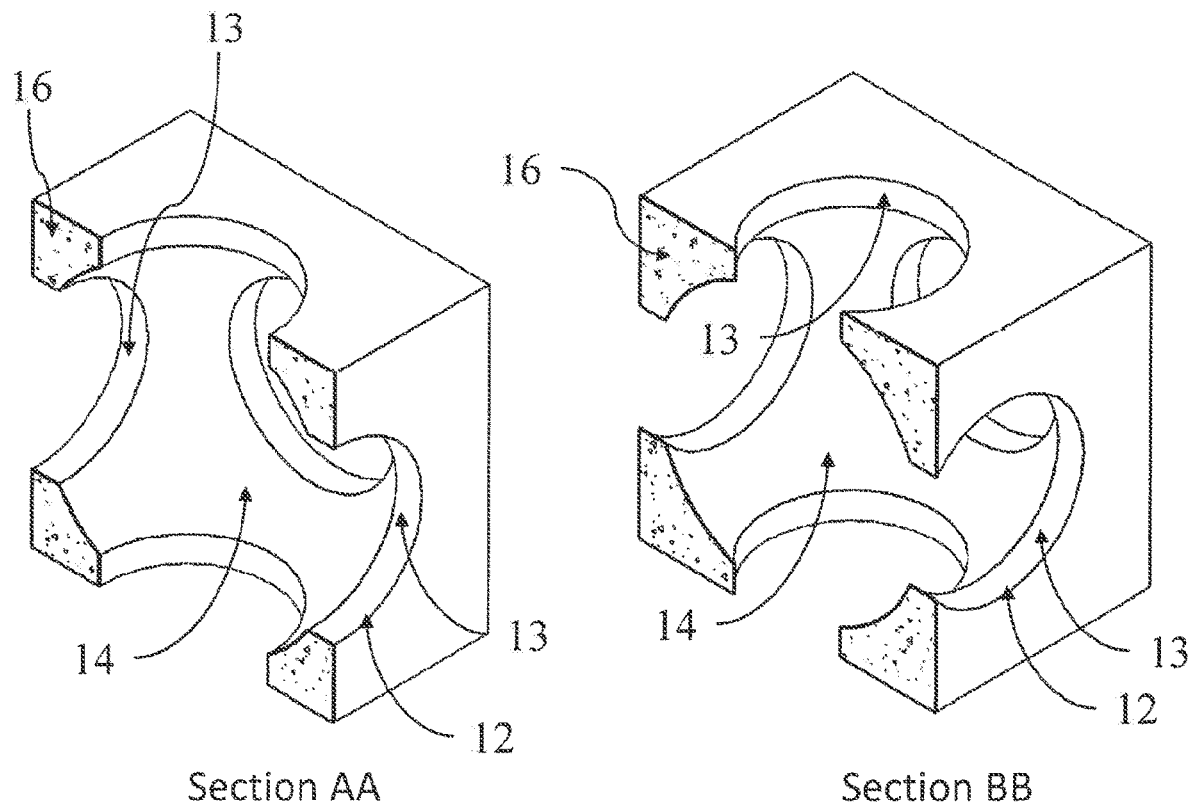
FIG. 2 schematically illustrates a cross section of the artificial reef block shown in FIG. 1.

FIGS. 2a and 2b show the two cross-sectional views across the lines labelled AA and BB respectively shown in FIG. 1 for artificial reef block 10. The cross-sections show cylindrical spaces 13, central spherical cavity 14, side entrances 12, and side walls 16. Marine life can enter or exit the spherical centre cavity 14 of the artificial reef block 10 through any of the circular entrances 12. Similarly water may pass through relatively uninhibited, allowing a current to impinge upon the artificial reef blocks without hitting a completely solid surface; for this reason reef blocks 10 may also be used to reduce currents and therefore as a sea barrier.

Generally an artificial reef block 10 can be submerged underwater individually or as part of a cluster of two or more blocks. The spherical cavity 14 creates a uniform centre of arches that enable the reef blocks 10 to be weight bearing and so may be stacked to a relatively large number of layers, for example up to 10 layers. Unlike other sea walls and sea defences, the spherical central cavity 14, with the entrances from the exterior to interior allows some water current to pass through the wall hence acting to reduce the force impinging upon it due to the current. One skilled in the art can conceive of various combinations of sizes and, shapes of artificial reef blocks to form a variety of structures.

Figure 3A:
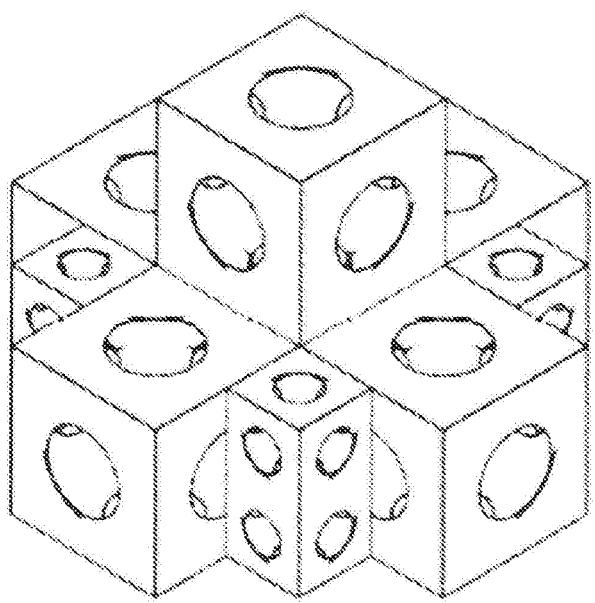
FIG. 3 schematically illustrates example clusters of an artificial reef block in accordance with an embodiment of the present invention.
Figure 3B:
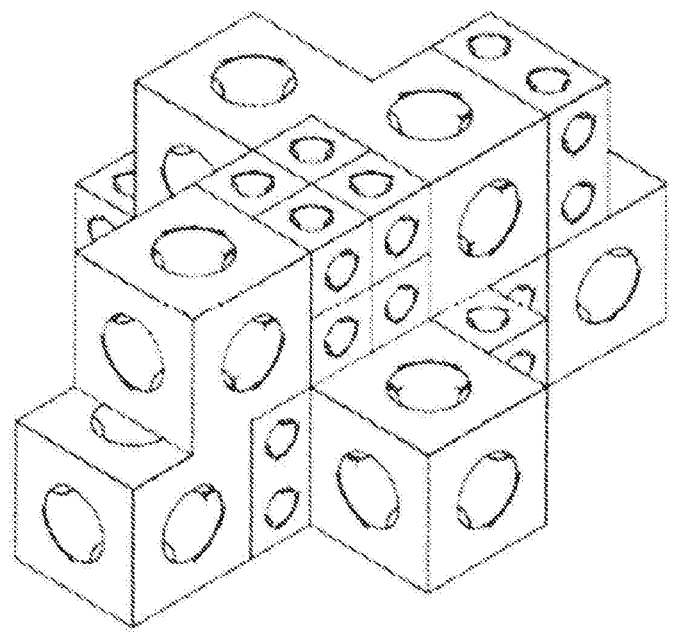
Figure 3C:
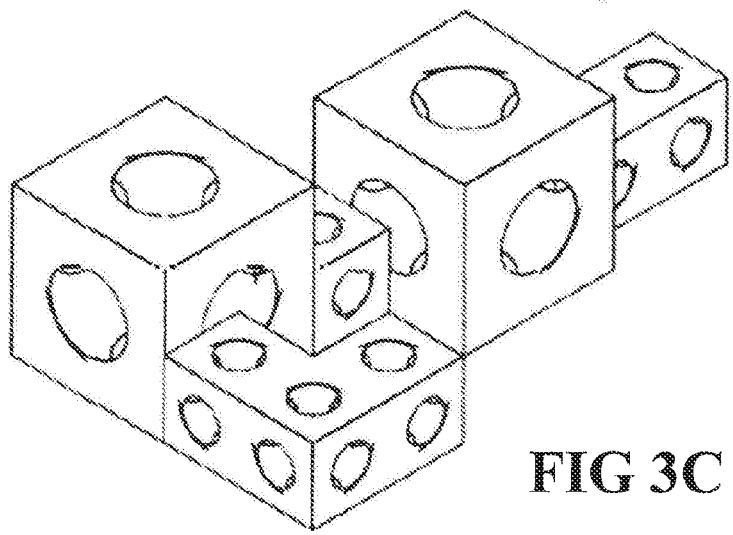
Figure 4:
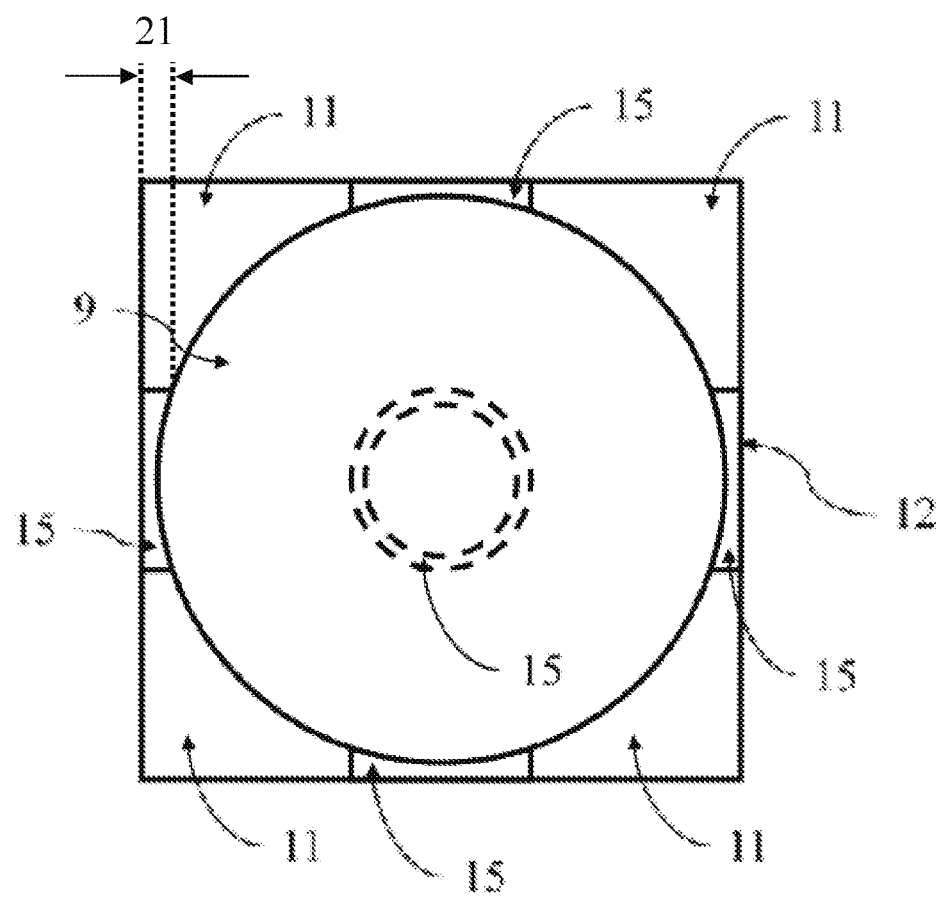
FIG. 4 schematically illustrates a method of construction of the artificial reef block.

Some illustrative structures are shown in FIGS. 3a, 3b, and 3c. Two sizes of the artificial reef block 10 are illustrated in various structures and arrangements forming conditions suitable for the promotion of marine life and flora and fauna. The cuboid structure allows the reef blocks 10 to be easily stacked, and the central cavity forms a plurality of central arches and columns for bearing the weight of the artificial reef blocks. The illustrative structures may create a large protected environment inside of the artificial reef blocks for marine life to thrive.

The method of construction of an artificial reef block 10 in accordance with an embodiment of the present invention comprises placing a spherical inflatable bladder 9 inside a cuboid crate 5. The size of the spherical bladder 9 corresponds to the inside dimension of the central spherical cavity section (FIG. 1, 14) required for the artificial reef block 10; and the inner dimensions of the cuboid crate 5 match that of the outer dimensions of the artificial reef block (1×1×1 m) 10. Six edging rings 15 are used to position the spherical bladder in the centre of the cuboid crate 5. The thickness or length of respective edging rings 15 are greater than or equal to the difference between the diameter of the inside of the cuboid crate 5 and the spherical bladder 9.

For example, if the inside of the cuboid crate 5 is 1×1×1 m and the outer diameter of the spherical bladder 9 is 0.8 m, then the width of each of the six edging rings will be greater than 0.1 m. The larger the entrance 12 required, the larger the diameter of the six edging rings required. The larger the diameter of a ring, the greater its axial length 21 will need to be, because the distance between the outer of the spherical bladder 9 and inner of the cuboid crate 5 increases with ring diameter. The six edging rings form a join between the inside of the small cuboid crate 5 and the outer surface of the spherical bladder 9.

Once all of the rings are in place, the space 11 between the inner walls of the cuboid crate 5 and the outer surface of the spherical bladder 9 can be filled with a concrete mix.

In the described embodiment, the six edging rings 15 are cylindrical in shape, with length 21 but are not limited to such a configuration. One skilled in the art may envisage embodiments in which the rings are such that the walls are conical, angled, convex or concave for example. They may also be other shapes, and not always a circular cross-section, such that they create a join between the six inner surfaces of the cuboid crate 5 and the outer surface of the spherical bladder 9. Respective edging rings 15 do not need to be the same size, diameter, or thickness so long as the continuous join between the six inner surfaces of the small cuboid crate 5 and the outer surface of the spherical bladder 9 is maintained. For example, one could have smaller rings on two of the faces and so on.

The cuboid crate 5 may be constructed of wood, metal, plywood, fibreglass, plastic or any other similar material. One skilled in the art can easily envisage a crate 5 constructed of any or a combination of any of the aforesaid materials.

If an artificial reef using one or more embodiments of the present invention is to be built in a region where there are strong currents and under water turbulence is present, a much stronger structure is required than might be achieved using the aforesaid arrangements. This is addressed in another embodiment of the invention illustrated in FIG. 5, which shows a IO schematic of a single artificial reef block 18 with male and female formations on respective faces of two of the exterior faces 20 and 22 respectively. The inter-engageable members on the ends of the reef block are such that one end of one artificial reef block can be engaged with the complementary end formation of another reef block to form an interlocked arrangement forming something akin to a single monolithic structure.

The term "monolithic" is used herein to refer to a structure that substantially appears and acts as a single structure although comprised of smaller components, described here with interengagement formations, which may be interlocking formations. Two or more artificial reef blocks can be engaged in this way, allowing formation of as large a monolithic structure as required for the given application. This may include but not be limited to sea defences, large artificial reef structures, submerged breakwaters and anti-trawling devices for example.

Similar to other embodiments, artificial reef block 18 has cylindrical spaces 13, spherical centre cavity 14 with entrances 12. The number of entrances is reduced to four in this embodiment due to the male and female formations 20 and 22 at respective opposite walls. The male and female formations 20 and 22 respectively are at a position such that they are in the same plane and on exterior faces opposite one another. In the illustrative FIG. 5, the male and female formations are in the form of a sliding dovetail like joint.

The sliding dovetail joint provides the interlocking strength achieved by a conventional dovetail joint, but with the ability of some vertical movement if required. The male formation 20 slides into the female formation 22 and one may be engaged with the other by vertically offsetting two artificial reef blocks such that the bottom face of one artificial reef block 18, is opposite to top face of another artificial reef block; aligning rear faces 24 on one artificial reef block 18 to the front faces 26 of the second reef block 18; and then providing a vertical motion such that the top face of one artificial reef block 18 is in alignment with the second artificial reef block 18 and lowering one reef block 18 with respect to the other to engage respective male and female formations, hence interlocking the two artificial reef blocks 18 together.

Thus two or more artificial reef blocks may be interlocked together to form a long, substantially immoveable monolithic structure with high strength due to the interengaging formations. Although the described embodiment uses a sliding dovetail joint, one skilled in the art may envisage other joining mechanisms which offer similar strength and ability to for a monolithic structure.

Figure 5:
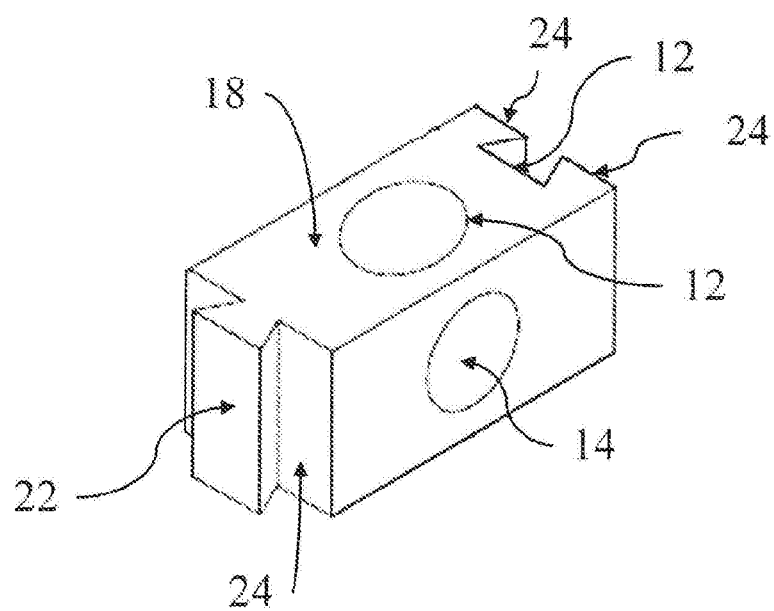
FIG. 5 schematically illustrates an isometric projection of one embodiment of an interlockable artificial reef block in accordance with an embodiment of the present invention.
Figure 6A:
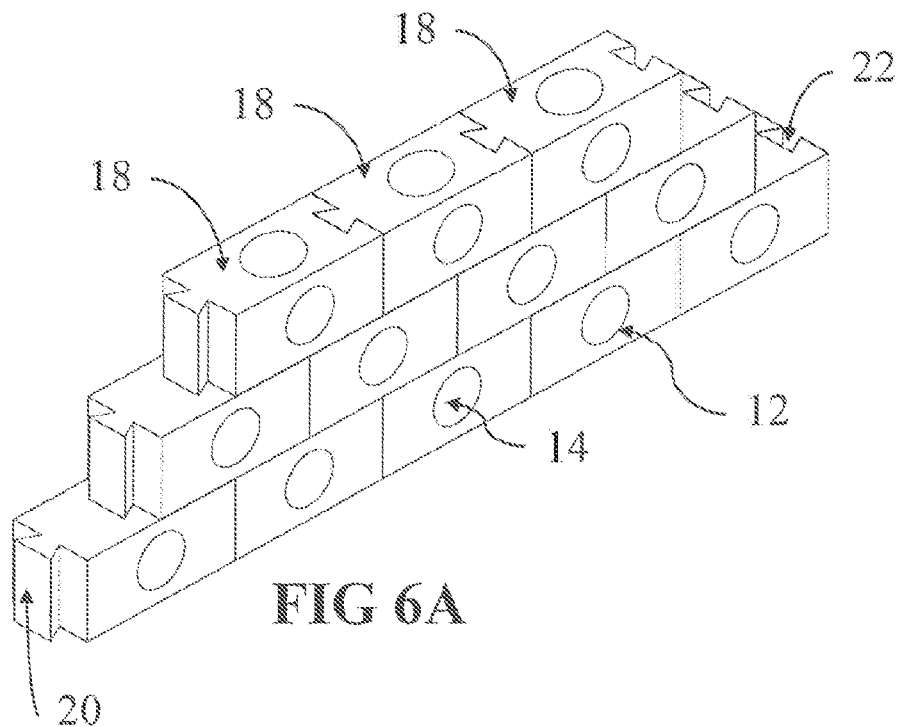
FIG. 6 schematically illustrates a plurality of the artificial reef block embodiment shown in FIG. 5 arranged to form a seawall or artificial reef.
Figure 6B:
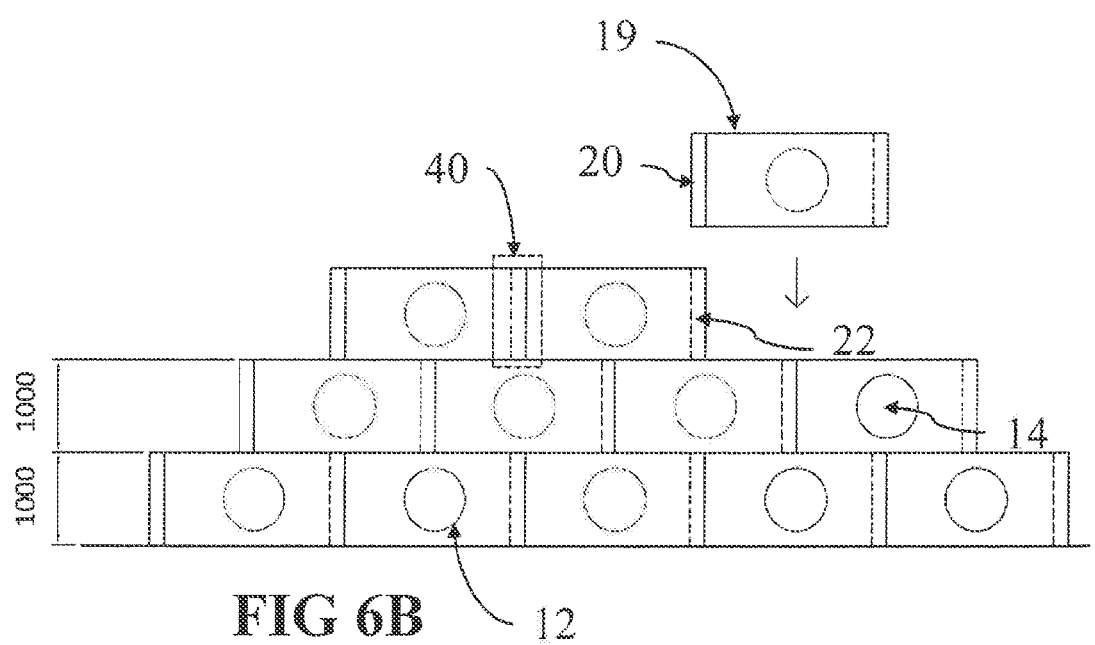

The artificial reef block 18 shown in FIG. 5 is also capable of being stacked which will allow even larger structures to be formed with the added strength of the horizontal coupling of the sliding dovetail joints 40. Illustrative structures are shown in FIGS. 6 a) and 6 b). FIGS. 6 a) and 6 b) show a plurality of interlocked artificial reef blocks 18 forming a large monolithic structure which, due to the central spherical cavities 14 and entrances 12, allows currents to flow through the barrier. The central spherical cavities 14 and entrances 12 act so as to reduce the local current and thereby reduce the scouring effect around subsea structures such as monopiles for wind turbines and the like. FIG. 6b also shows a method of stacking the artificial reef blocks 18. Here an artificial reef block 19 is shown to be moved in a downward direction to add to the large monolithic structure. Its male formation 20 is aligned with a female formation 22 on another artificial reef block such that when 19 is moved vertically downward, it interengages with another artificial reef block 18 forming a strong male-female interlocking joint 40. Here the bottom wall of the artificial reef block 19 is supported by the top walls of the artificial reef blocks it is placed on. This is the manner of the stack support provided to each subsequent layer of blocks.

Figure 7:
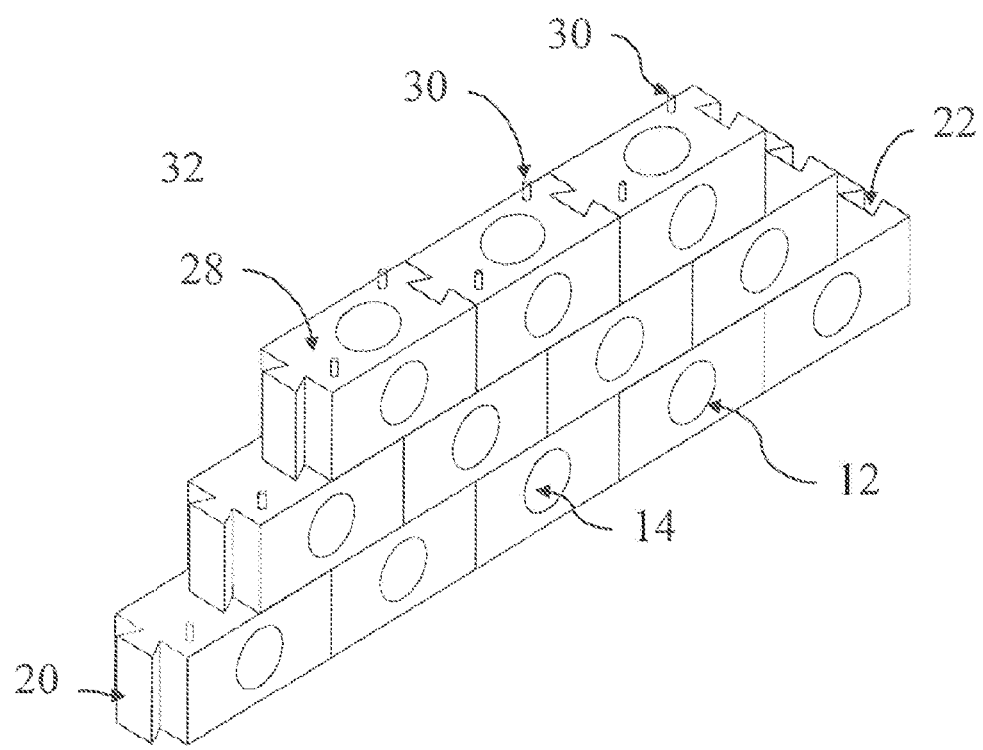
FIG. 7 schematically illustrates another embodiment of an interlockable artificial reef block with male and female formations for mutual interengagement.

One skilled in the art will understand that in stacked formation and aperture may be occluded or partially occluded, but will still act to allow the flow of water through the structure.

Where an even greater strength in a monolithic structure is required, at least one other embodiment may be envisioned. FIG. 7 illustrates another variant of the artificial reef block and is similar to the embodiment shown in FIG. 5. An artificial reef block 28 includes entrances 12, cylindrical space 13, central spherical space 14, male formation 20, corresponding female formation 22 and vertical dowels 30. It is the vertical dowels 30 that distinguishes this particular embodiment to the one in FIGS. 6 (6a, and 6b). The vertical dowels 30 have a corresponding female formation on the opposite face of the artificial reef block 28. In this embodiment the dowels are positioned on one face of the artificial reef block 28 with the corresponding female part disposed on the opposing face of a second artificial reef block. FIG. 7 shows two vertical dowels 30, but in other embodiments not shown any suitable number may be used. The shape and form of the dowel and corresponding hole may be other than cylindrical as well. In this illustrative embodiment the dowels are cylindrical in shape but other shapes may be used, for example square or polygon cross-section dowels.

FIG. 7 shows an example monolithic structure 32 which incorporates the dowels 30. In this embodiment, the individual artificial reef blocks 28 are stacked such that each layer is offset by half the length of the artificial reef block. This is similar to a common running bond used in brick laying. In other embodiments one may use an arrangement that uses different patterns and types of offsets and embodiments of the present invention is are not limited to the current embodiment or embodiments discussed herein.

Figure 8A:
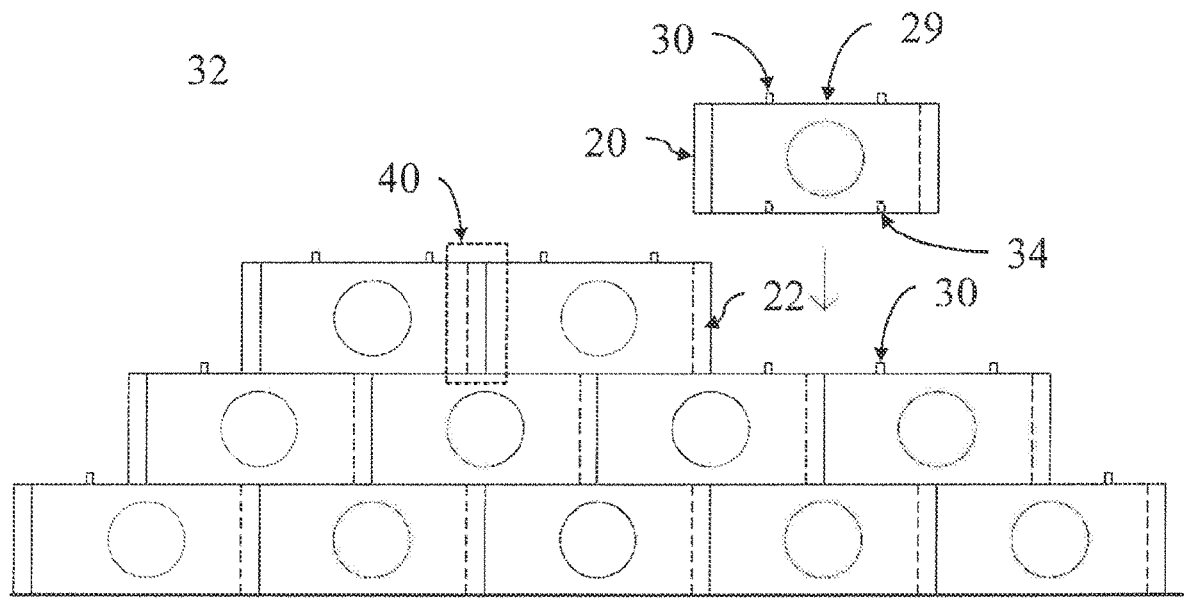
FIG. 8 schematically illustrates the embodiment shown in FIG. 7 from other perspectives.

FIG. 8a shows a different perspective of the monolithic structure 32 illustrated in FIG. 7. FIG. 8 a) shows a plurality of interlocked artificial reef blocks 28 forming a large monolithic structure, which due to the central spherical cavities 14 and entrances 12, allow currents to flow through the monolithic structure 32. The central spherical cavities 14 and entrances 12 will act so as to reduce the local current and thereby reduce the scouring effect around subsea structures such as the monopile of wind turbines and the like. FIG. 8 a) also shows the method of stacking the artificial reef blocks 28. Here an artificial reef block 29 is shown to be moved in a downward direction to add to the large monolithic structure. Its male formation 20 is aligned with a female formation 22 on another artificial reef block such that when 19 is moved vertically downward, it interlocks together with another reef block and forms a strong male-female interlocking joint 40. The dowels 30 align with the holes 34 thereby creating a strong interlocking between successive stacked rows.

Figure 8B:
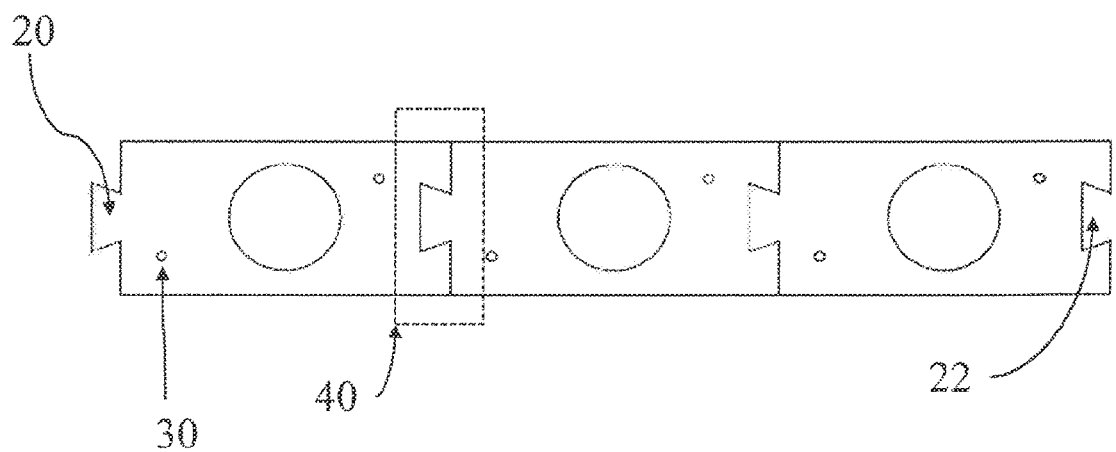

FIG. 8b shows a plan view of three interlocked artificial reef blocks 28 with the dowels in place. The male projection 20 is interlocked with a female formation 22 on another artificial reef block 28 to form the male-female interlocking joint 40. It also shows the relative position of the dowels 30 to the female holes 34 in this embodiment. They are diagonally opposite in the plane shown, so that when stacked they overlap by half the length of the artificial reef block 28.

When stacked, the vertical dowels act to add strength vertically between adjacent rows of artificial reef blocks. This inhibits movement of vertically adjacent rows with respect to each other due to water pressure from undersea currents and forces.

Figure 9A:
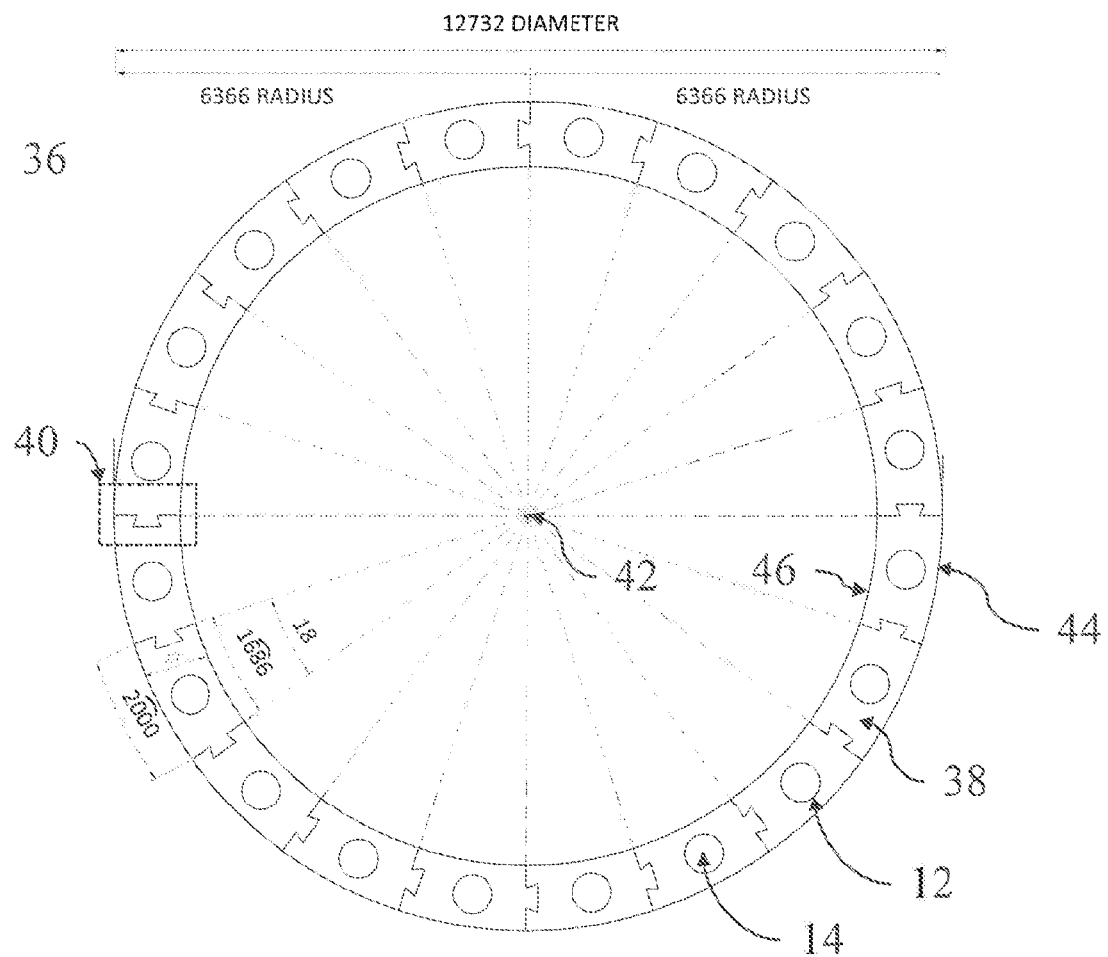
FIG. 9. Schematically illustrates another embodiment of the interlocking artificial reef blocks in accordance with the present invention, in which the artificial reef blocks forms a ring-like, monolithic structure.
Figure 9B:
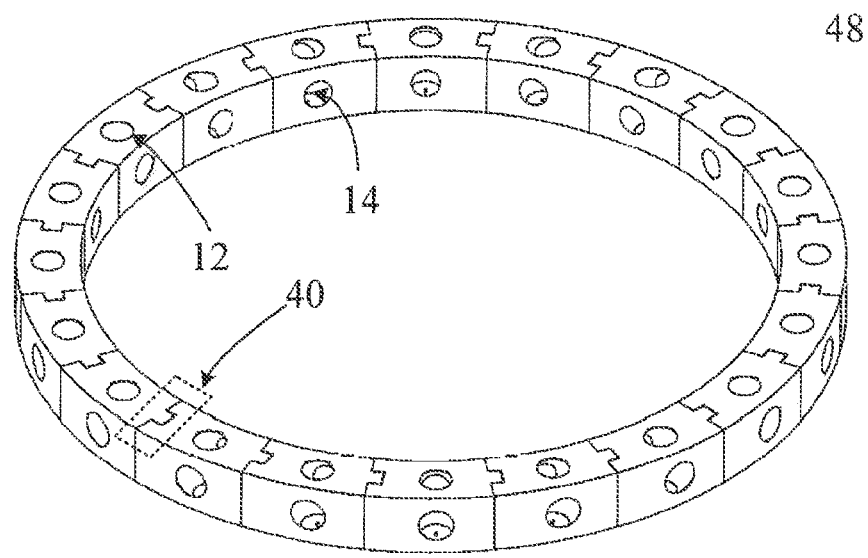

In another embodiment of the invention, an interlockable artificial reef block may be curved so that when a plurality of artificial reef blocks are coupled together they form a circular monolithic structure rather than a linear monolithic structure. An example is shown in FIG. 9 a). FIG. 9 a) shows a schematic plan view of a circular monolithic structure 36. In a particular embodiment it is in the form of a ring with an outer diameter of 12.732 m, and thickness 1m. Structure 36 is comprised of twenty curved artificial reef blocks 38. Thus each artificial reef block fits inside of an 18 degree sector of the circle formed by the outer diameter. The individual curved artificial reef blocks have an outer radius of 6.366 m 44, an inner radius of 5.366 m 46, and both radii are concentric meaning they have a common centre 42. Each of the curved artificial reef blocks 38 have a spherical central space 14 and entrances 12. They are similar to the other embodiments of the current invention in that they have the male formation on one end, and the female formation on the opposing end to form of a sliding dovetail joint. Both can be brought into an interlocking arrangement 40 which will give the structure great strength from subsea currents and forces. The spherical cavities 14 and entrances 12 allow the currents to flow through and around the support monopile of a wind turbine, and therefore reduce the effect of seabed scouring that occurs. A 3D isometric projection of this embodiment is illustrated in FIG. 9b.

The illustrated embodiment is for a fixed radius structure, but can be changed to accommodate larger or smaller monopiles or other curved circular configurations.

In another embodiment of the invention the material used for the construction of the artificial reef block may be comprised of a high-impact, durable plastic material so as to discourage the growth of marine life, while still acting to reduce the seabed scour around fixed structures. This will allow the artificial reef blocks to be removed easily when the structure is required to be removed. For example, some wind farms have the requirement that all aspects of the wind turbines must be removed when their end of life is reached, which may include the wind turbine itself, support pole, any scouring protection and the like. In this instance, the artificial reef blocks employed as scour protection will be required to be removed. With 25 years of marine life growth, this will be very difficult to achieve, and therefore a solution which inhibits marine life growth will need to be employed.

Some examples of suitable material are thermoplastics such as Low Density Polyethylene (LDPE), High Density Polyethylene (HDPE), Polypropylene, Polyvinyl Chloride (PVC), Polyethylene Terephthalate (PET), recycled plastic, or other similar materials. The method of construction could be, but not be limited to, extrusion moulding, injection moulding, vacuum forming, stretch moulding, or blow-moulded.

Figure 10:
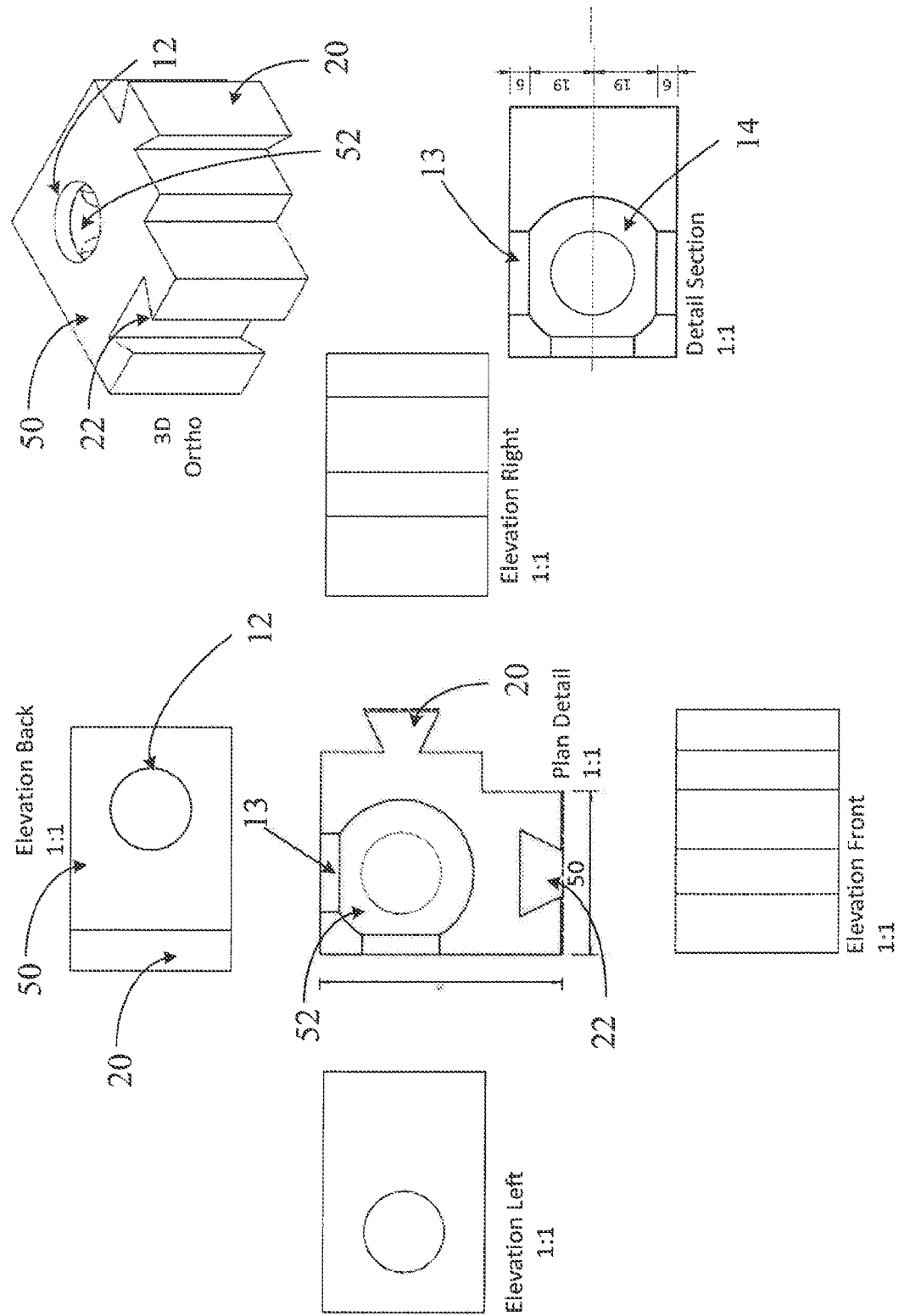
FIG. 10 schematically illustrates an isometric projection of one embodiment of an interlockable artificial reef block in accordance with an embodiment of the present invention.

FIG. 10 shows an illustrative schematic and projection of a single interlockable reef block 50 in accordance with another embodiment of the present disclosure and is similar to that shown in FIG. 5. Block 50 includes male and female formations on respective faces of two of the exterior faces 20 and 22 respectively. The inter-engagable members on the exterior of the reef block are such that one end of one artificial reef block can be engaged with the complementary end formation of another reef block to form an interlocked arrangement forming something akin to a single monolithic structure. Engagement members 20 and 22 are at 90 degrees to one another and may be used to form a corner piece of a monolithic structure. Interlockable reef block 50 includes entrances 12 which are the points at which water, fish and other sea creatures may enter. They allow a passage from the exterior to interior of the artificial reef block 50 and are situated in the centre of all of the external faces. There are cylindrical spaces 13 extending inward from respective exterior faces of the reef block 50, to the interior spherical cavity 14.

FIG. 11 shows an illustrative schematic and projection of a single interlockable reef block 56 in accordance with another embodiment of the present disclosure. Block 56 includes four female formations 22 on respective faces. The inter-engagable members on the exterior of the reef block are such that one end of one artificial reef block can be engaged with the complementary end formation of another reef block to form an interlocked arrangement forming something akin to a single monolithic structure. Female formations 22 are at 90 degrees to one another and may be used to form a cross piece of a monolithic structure. Interlockable reef block 56 includes entrances 12 which are the points at which water, fish and other sea creatures may enter. They allow a passage from the exterior to interior of the artificial reef block 56 and are situated in the centre of all of the two remaining faces. There are cylindrical spaces 13 extending inward from respective exterior faces of the reef block 56, to the interior spherical cavity 52.

Figure 12:
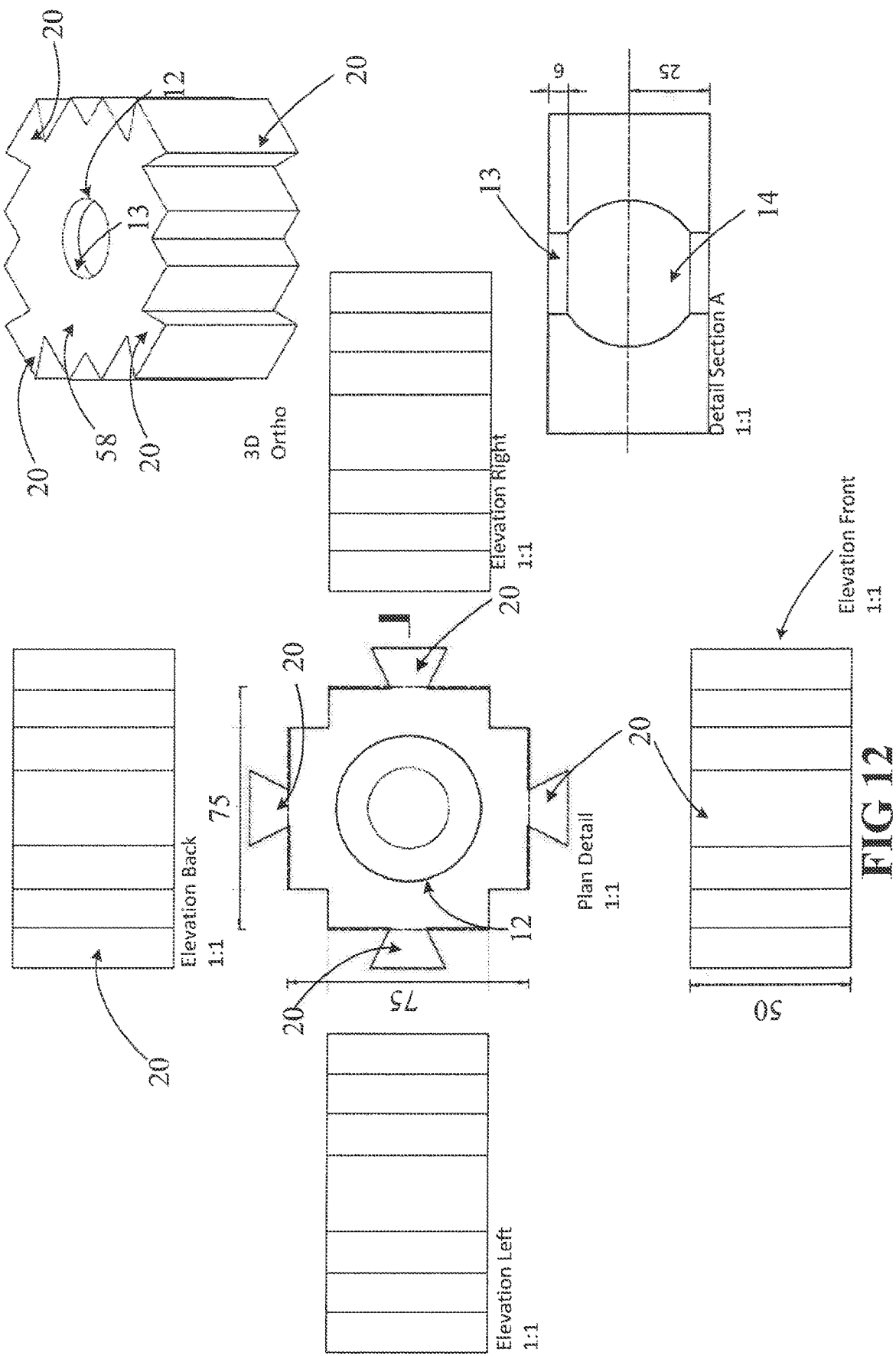
FIG. 12 schematically illustrates an isometric projection of one embodiment of an interlockable artificial reef block in accordance with an embodiment of the present invention.

FIG. 12 shows an illustrative schematic and projection of a single interlockable reef block 58 in accordance with another embodiment of the present disclosure. Block 58 includes four male formations 20 on respective faces. The inter-engagable members on the exterior of the reef block are such that one end of one artificial reef block can be engaged with the complementary end formation of another reef block to form an interlocked arrangement forming something akin to a single monolithic structure. Male engagement members 20 are at 90 degrees to one another and may be used to form a cross piece of a monolithic structure. Interlockable reef block 58 includes entrances 12 which are the points at which water, fish and other sea creatures may enter. They allow a passage from the exterior to interior of the artificial reef block 56 and are situated in the centre of all of the two remaining faces. There are cylindrical spaces 13 extending inward from respective exterior faces of the reef block 58, to the interior spherical cavity 14.

Figure 13:
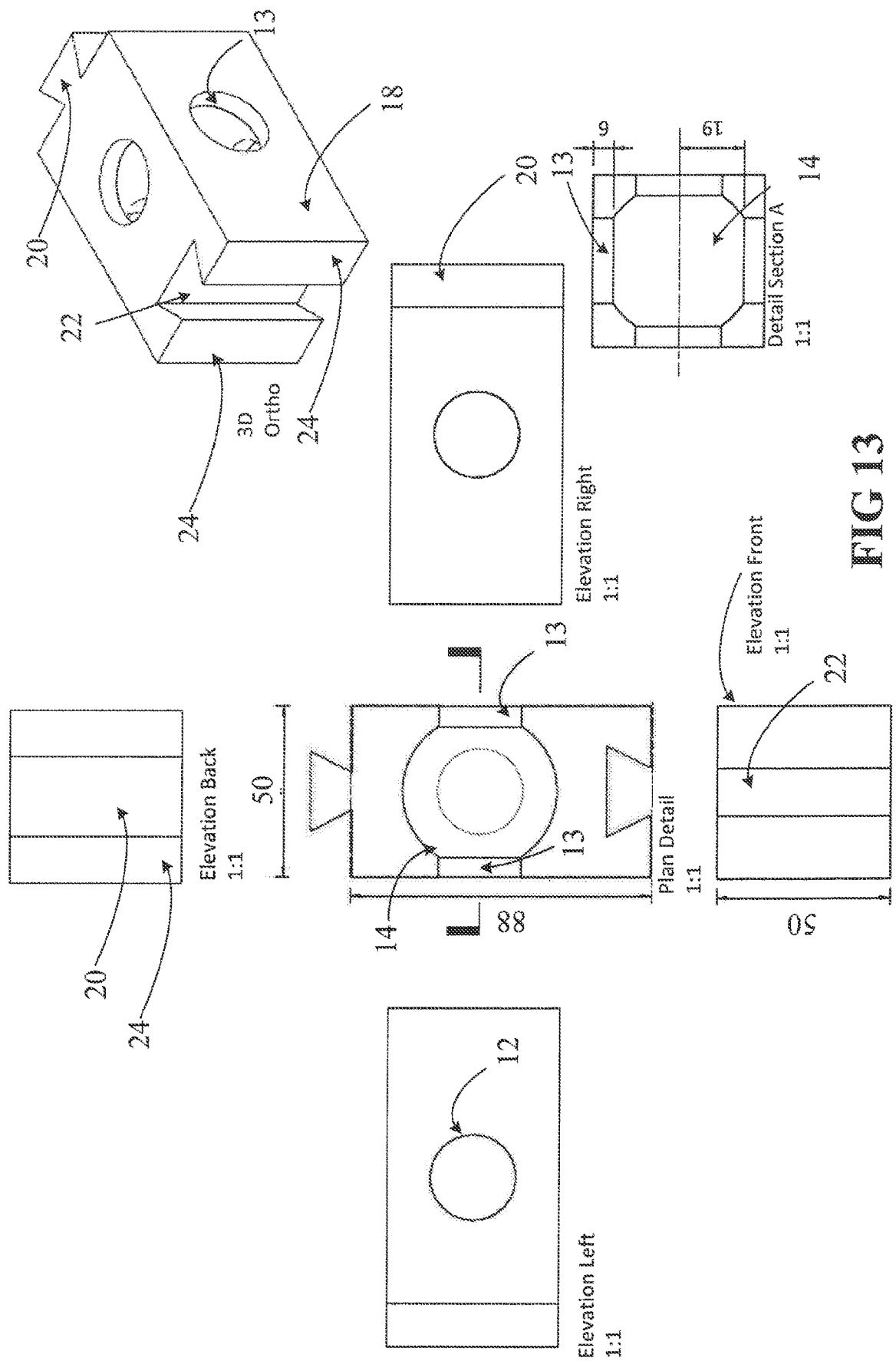
FIG. 13 schematically illustrates another embodiment of an interlockable artificial reef block with male and female formations for mutual interengagement.

FIG. 13 shows an illustrative schematic and projection of the single artificial reef block 18 of FIG. 5. Block 18 includes male and female formations on respective faces of two of the exterior faces 20 and 22 respectively.

Figure 14:
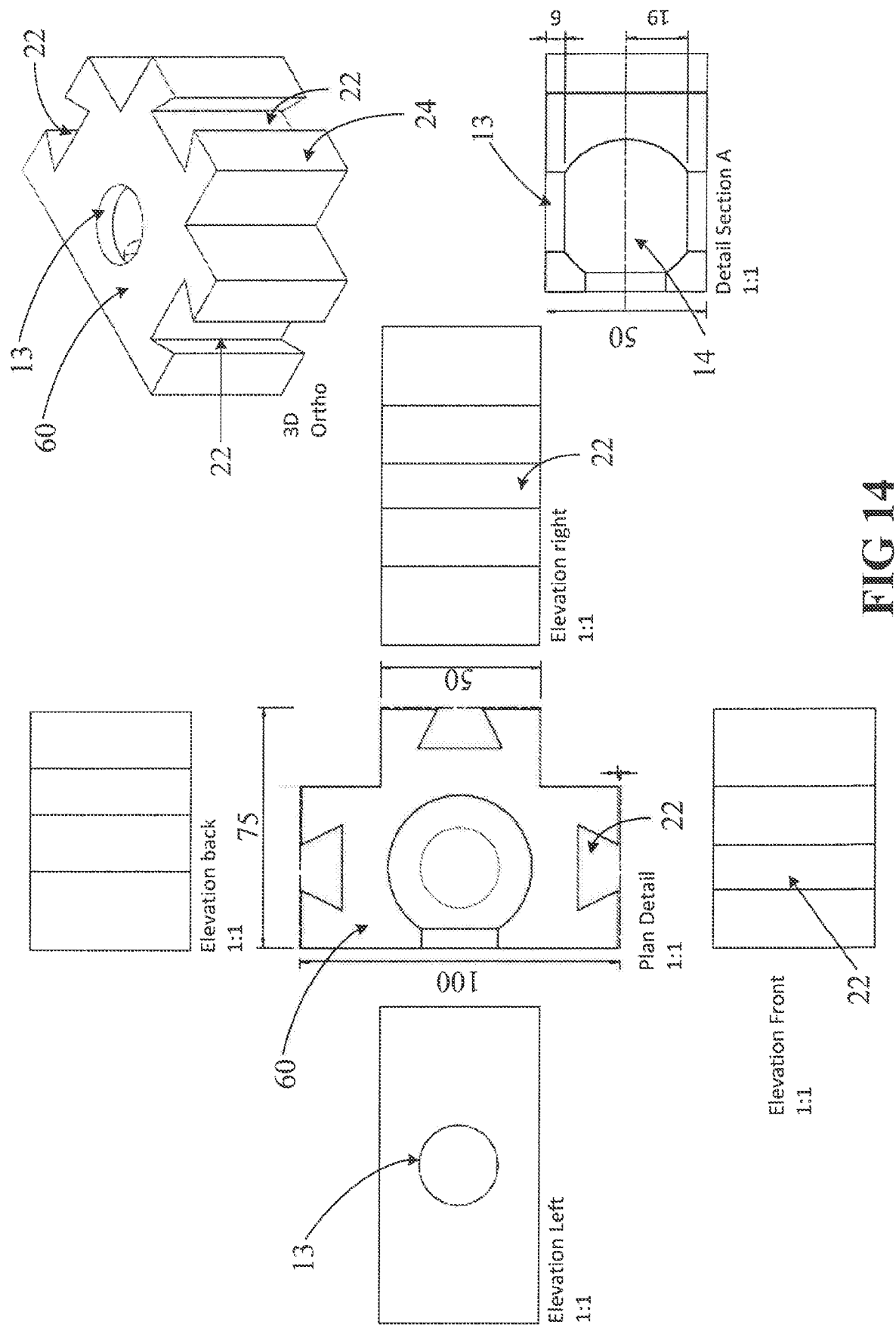
FIG. 14 schematically illustrates an isometric projection of one embodiment of an interlockable artificial reef block in accordance with an embodiment of the present invention.

FIG. 14 shows an illustrative schematic and projection of a single interlockable reef block 60 in accordance with another embodiment of the present disclosure. Block 60 includes three female formations 22 on three respective faces. The inter-engagable members on the exterior of the reef block are such that one end of one artificial reef block can be engaged with the complementary end formation of another reef block to form an interlocked arrangement forming something akin to a single monolithic structure. Female formations 22 are at 90 degrees to one another and may be used to form a T-piece of a monolithic structure. Interlockable reef block 60 includes three entrances 12 which are the points at which water, fish and other sea creatures may enter. They allow a passage from the exterior to interior of the artificial reef block 60 and are situated in the centre of all of the two remaining faces. There are cylindrical spaces 13 extending inward from respective exterior faces of the reef block 60, to the interior spherical cavity 14.

Figure 15:
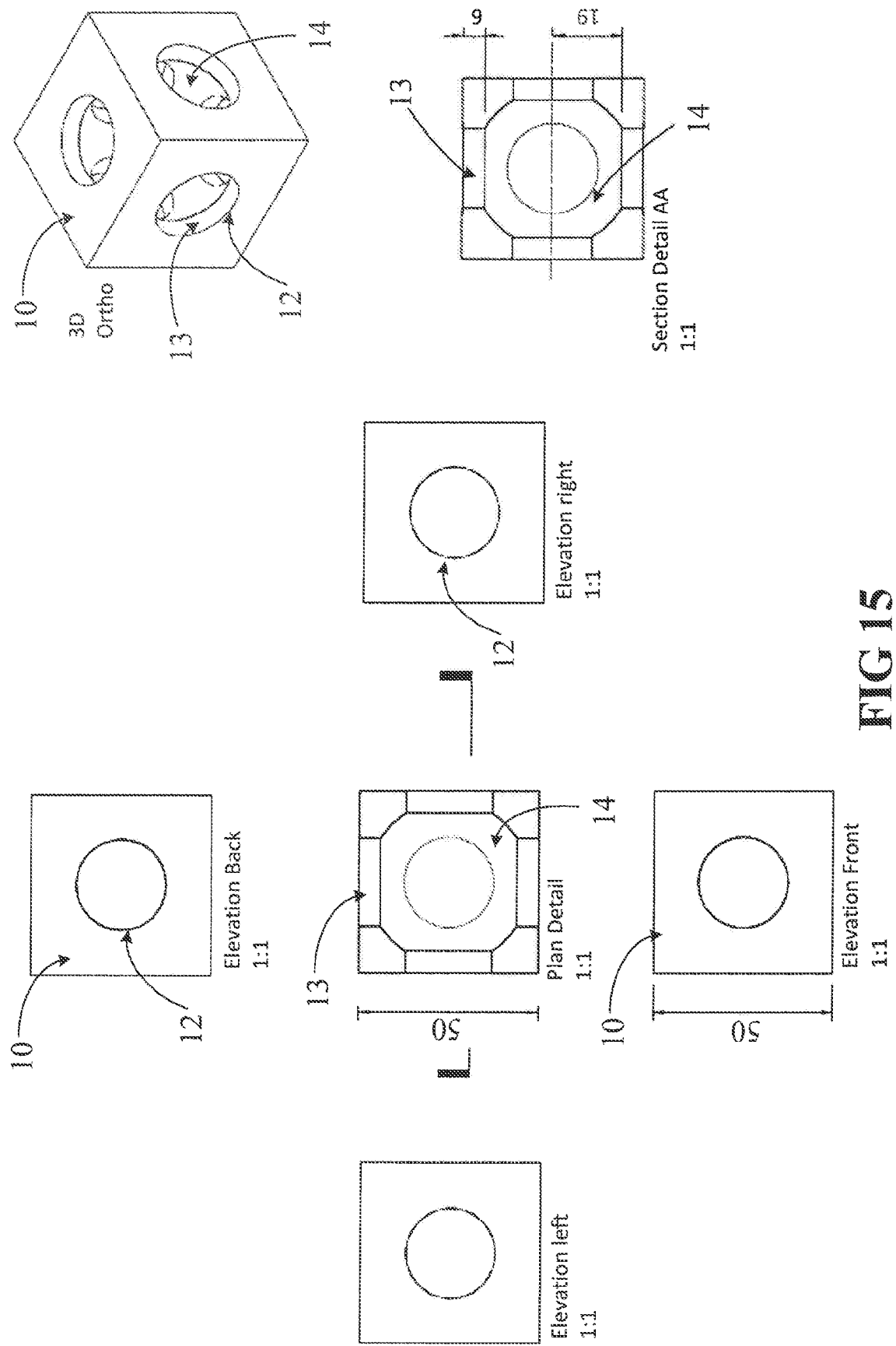
FIG. 15 schematically illustrates an isometric projection of an embodiment of an artificial reef block in accordance with an embodiment of the present invention.

FIG. 15 shows an illustrative schematic and projection of the single artificial reef block 10 of FIG. 1.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention. For example, joints other than dovetail joints may be used such as mortise and tenon joints, finger joints, box joints, tongue and groove joints and dowel joints. Embodiments in accordance with the present invention have been described with reference to a monopile support structure for a wind turbine. One or more embodiments may be applicable and usable for support structures other than monopile structures such as tripods for example. Additionally, embodiments of the present invention are not limited to inhibiting sea bed scouring around support structures for wind turbines but may be used to inhibit scouring around any structure located on a seabed. They may also be used for other purposes such as for creating artificial reefs, mooring points, shellfish farm lines, anti-trawling structures and other underwater structures and even above water structures.

Other uses of the reef block 10 may include use of human remains to be cast into the concrete mix to from a personal burial/memorial reef; use as a mangrove planter whereby the hard substrate retains the plant in its place while the hole provides room for roots and water or mineral absorption. This may be particularly useful because mangroves cover coast lines all over the world and act as a natural sea defence.

Moreover, the reef block 10 may be used as a static shellfish farm. The structures can act as a natural reef system in which shellfish such as crab, lobster, crayfish and the like can enter the structure naturally and be removed by hand by a diver. This eliminates large strings of crab/lobster pots being placed on the seabed which not only drag along delicate sea beds, but can also break off from their surface buoy and become "ghost "fishing gear (effectively meaning they drift along the seabed trapping animals for years to come with no way of them escaping. With the need for sustainable fishing becoming more relevant there is wide spread need of sustainable farming methods of the sea.

Off-shore cable protection for the offshore renewable energy sector may be provided by the use of the reef blocks 10 individually or as a monolithic structure. In order to transfer the power generated from tidal/wave, solar and wind farms back to shore. Large cables relay the electricity back from the offshore unit to the land based transformer/substation and these cables are often protected with loose rubble and rock blankets/bags.

Although one example of the concrete mix mentions Portland cement, the present disclosure is not limited to just that. Portland cement is extremely carbon dioxide intense in its production process. Other cements such as PFA (pulverised fly ash), GGBS (or GGBFS) Ground-granulated blast-furnace slag or a magnesium based cement may be used for their beneficial carbon dioxide properties. The cement may be a carbon dioxide negative material which absorbs more carbon dioxide in its production than it releases.

Furthermore, the concrete may also include crushed shellfish shells to entice marine life to the area.

Although curved interlocking reef blocks have been described non-interlocking reef blocks may be curved.

The terms used herein should be construed in context. As one example, the term "unconstrained" when referring to the water flow path through aperture spaces and the cavity formed by the central cavity should be understood as including arrangements which have a limited number of or indeed no barriers or other objects in the water flow path defined by the apertures and cavity. The term "unconstrained" may be construed to mean "substantially unconstrained".

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A module for an underwater structure, the module comprising a plurality of walls defining a cavity configured such that at least two walls of said plurality of walls confront one another to provide respective stack support surfaces for supporting said module,
   wherein two or more walls of said plurality of walls each comprise an aperture providing a conduit through each two or more walls to said cavity, respective apertures of said two or more walls and said cavity configured to provide a water flow path into, through and from said cavity;
   wherein said cavity comprises curved walls forming a central spherical cavity, the curved walls configured to provide a support arch for one or more of said plurality of walls; and
   wherein the aperture in each of said two or more walls further comprise a cylindrical space extending inward from their respective exterior faces to said cavity.

2. The module of claim 1, wherein said walls comprise a masonry material.

3. The module of claim 2, wherein said masonry material is concrete.

4. The module of claim 1, wherein said cavity and/or said apertures are configured to provide sufficient mechanical strength to support at least one said module.

5. The module of claim 4, wherein said curved walls of the cavity are configured to provide a vault-like support for one or more of said plurality of walls, in addition to said support arch.

6. The module of claim 1, wherein at least one of said plurality of walls comprises a rough outer surface.

7. The module of claim 1, the module further comprising an engagement formation on at least one of said plurality of walls configured to engage with a complementary formation disposed on an external element external to said module.

8. The module of claim 7, wherein said engagement formation is disposed on an outer wall of said one or more plurality of walls.

9. The module of claim 7, further comprising said engagement formation on at least two of said plurality of walls and wherein a first said engagement on a first of said at least two of said plurality of walls is complementary to a second said engagement formation on a second of said at least two of said plurality of walls.

10. The module of claim 9, wherein said at least two of said plurality of walls oppose each other.

11. The module of claim 9, wherein said engagement formation on said at least two of said plurality of walls is configured for engagement with a laterally disposed element external to said module.

12. The module of claim 9, wherein said engagement formation on said at least two of said plurality of walls is configured for engagement with a vertically disposed element external to said module.

13. The module of claim 12, wherein said at least two of said plurality of walls provide said respective stack surfaces.

14. An external element configured to engage with the module of claim 7.

15. A structure comprising a plurality of modules, wherein each of the plurality of modules comprises the module of claim 7, wherein a first group of said plurality of modules support a second group of said plurality of modules, a stack surface of each of said second group of said plurality of modules resting on one or more stack surfaces of said first group of said plurality of modules.

16. The structure of claim 15, wherein adjacent modules in a lateral direction are interlocked with each other via said engagement formation and complementary engagement formation.

17. The structure of claim 15, wherein adjacent modules in a vertical direction are interlocked with each other via said engagement formation and complementary engagement formation.

18. The module of claim 1, wherein said walls comprise a plastic material.

19. The module of claim 1, wherein said cavity and/or said apertures are configured to provide sufficient mechanical strength to support up to five of said modules.

20. The module of claim 1, wherein said cavity and/or said apertures are configured to provide sufficient mechanical strength to support up to ten of said modules.

* * * * *